United States Patent [19]

Russell-Smith et al.

[11] Patent Number: 5,132,857
[45] Date of Patent: Jul. 21, 1992

[54] CARRIER AND METHOD OF ATTACHMENT FOR DISK FILE HEAD/ARM ASSEMBLIES

[75] Inventors: John H. Russell-Smith, Horndean; Ian S. Warn, Locks Heath, both of England

[73] Assignee: International Business Machines Corporation, Armonk, N.Y.

[21] Appl. No.: 576,520
[22] PCT Filed: Feb. 16, 1989
[86] PCT No.: PCT/GB89/00183
 § 371 Date: Oct. 4, 1990
 § 102(e) Date: Oct. 4, 1990
[87] PCT Pub. No.: WO90/09659
 PCT Pub. Date: Aug. 23, 1990
[51] Int. Cl.⁵ .............................................. G11B 21/26
[52] U.S. Cl. .................................. 360/104; 360/137
[58] Field of Search .............................. 360/104, 137

[56] References Cited

U.S. PATENT DOCUMENTS 3,080,642  3/1963  Woods et al. ........................ 29/603
4,387,409  6/1983  Otavsky et al. ...................... 360/104

FOREIGN PATENT DOCUMENTS 0234442  9/1987  European Pat. Off. .
0254558  1/1988  European Pat. Off. .
8519878 12/1985  Fed. Rep. of Germany .
0167489  7/1988  Japan .

OTHER PUBLICATIONS

Dickie et al., "Disk File Actuator", IBM TDB, Mar. 1976, vol. 18, No. 10, pp. 3435-3436.

Primary Examiner—David J. Severin
Attorney, Agent, or Firm—Robert W. Lathtinen

[57] ABSTRACT

A head carrier for carrying a plurality of head/arm assemblies each of which comprises a rigid arm portion supporting two flexures biased away from each other and a transducer bearing slider at the free end of each flexure. The head carrier provides the head/arm assemblies in the correct orientation for assembly to the actuator mechanism of a disk file. The head/arm assemblies can be attached to the actuator without removing the carrier.

12 Claims, 3 Drawing Sheets

CARRIER AND METHOD OF ATTACHMENT FOR DISK FILE HEAD/ARM ASSEMBLIES

TECHNICAL FIELD OF THE INVENTION

This invention relates to carries for magnetic head/arm assemblies as used in magnetic disk files and to methods of attaching such head/arm assemblies to the actuator mechanism of such disk files.

BACKGROUND OF THE INVENTION

Magnetic read/write heads used to access data on magnetic disks generally incorporate a transducer element mounted on a slider which is attached to a flexure. These head assemblies are themselves mounted, by the free end of the flexure, on rigid support arms to form head/arm assemblies. The head/arm assemblies are attached to an actuator mechanism, the movement of which causes the translation of the heads over the surface of the rotating disks.

Conventionally, at the point of manufacture of the head assemblies, the assemblies are processed individually. The processing steps include cleaning and testing. The head assemblies are then individually loaded into trays for transportantion from the head manufacturer to the point of final assembly at the disk file manufacturer.

At the disk file manufacturer the individual head assemblies are normally attached to support arms and the resulting head/arm assemblies mounted onto the actuator mechanism. This is a delicate and time consuming process, involving individual handling of the various assemblies and head to head alignment.

It can be readily appreciated that the excessive handling of individual heads and head/arm assemblies can cause a reduction in yield and a need for rework of partly assembled disk files to replace damaged heads.

European patent application 0 234 442 and U.S. Pat. No. 4,107,748 describe disk files which include armstack units onto which are mounted individual transducer head flexure assemblies. The armstack unit is removably attached to the actuator mechanism allowing easy removal for replacement of individual head/arm assemblies. The assemblies are individually attached to the armstack unit away from the actuator mechanism with the correct centre to centre spacing of the heads for merge to the disk stack. The armstack unit is then attached to the actuator mechanism.

While these pre-assembled arm stack units provide a simple means for achieving the correct alignment of the heads ready for merging with the disk stacks, they do not remove the need for individual handling by the disk file manufacturer of both heads and head/arm assemblies. Nor do they provide protection for the heads, once they are assembled to the armstack unit.

Thus there is a requirement for reducing handling of the heads during manufacture and transportation and also facilitating assembly of head/arm assemblies to the actuator of a disk file.

DISCLOSURE OF THE INVENTION

Accordingly the invention provides a head carrier for carrying a plurality of head/arm assemblies of the kind comprising a rigid arm portion supporting two flexures biased away from each other, each flexure in turn supporting at its free end a transducer bearing slider for cooperation with a disk of a disk file, such assemblies being mountable by their rigid arm portions in a moving actuator for moving them over the surface of such disks, the carrier comprising a protective partial enclosure for protecting the head/arm assemblies from damage when loaded in the carrier and said enclosure comprising location means for locating and supporting said head/arm assemblies in parallel spaced apart relationship at a pitch corresponding to their eventual location in the actuator so that the flexures and heads lie within the protective partial enclosure and at least a portion of the rigid arm projects outside the carrier to enable it to be mounted in such an actuator without removal of the carrier.

Preferably, said enclosure further comprises collapsing means acting on the two flexures so as to bring them together. In this way, the movement of the heads is further restricted thereby reducing the risk of damage and facilitating the subsequent merger of the heads with the disk stack.

Even though the head/arm assemblies are held relatively firmly in the carrier by the location means and the collapsing means it is preferable that the enclosure further comprises guide apertures corresponding to guide holes in such head/arm assemblies and that the carrier further comprises locking means adapted to register with both the guide apertures in the enclosure and the guide holes in the head/arm assemblies so as to lock the head/arm assemblies in the partial enclosure in said parallel spaced apart relationship.

The locking means could take a number of forms but it is preferable that it is a removable pin.

Preferably, the protective partial enclosure takes the form of two parallel side walls attached by a first cross member. Preferably the location means comprises a plurality of slots, one for each head/arm assembly, running along the length of the first cross member. It is further preferred that the collapsing means comprises a second series of slots, situated along the length of a second cross member.

The invention also provides a head carrier as described with the head/arm assemblies, as described above, loaded in the carrier.

The invention also provides a method for attaching a plurality of head/arm assemblies to the actuator mechanism of a disk file, comprising the steps of providing a head carrier with the head/arm assemblies loaded in place, presenting the loaded carrier to the actuator mechanism so that the projecting ends of the rigid arm portions are located in corresponding slots in the actuator mechanism and securing the head/arm assemblies by their rigid arm portions onto the actuator.

After that, the carrier can be removed leaving the assemblies in the actuator. Alternatively, the carrier can be left in place prior to the step of merging the heads to the disk stack.

Thus, head carriers according to the invention provide several advantages over the prior art. The head/arm assemblies can be manufactured and loaded into the carrier by the head manufacturer. Subsequent cleaning and testing of the head/arm assemblies can then be carried out whilst in the carrier. The head/arm assemblies can then be transported to the disk file manufacturer using the carrier to protect the heads. Finally on arrival at the point of final assembly to the actuator mechanism, the entire complement of head/arm assemblies is pre-oriented in the carrier for direct attachment to the actuator without the need to remove them from the carrier.

BRIEF DESCRIPTION OF THE DRAWINGS

The invention will now be described, by way of example only, with reference to the drawings, in which.

DETAILED DESCRIPTION OF THE INVENTION

Figure 1:
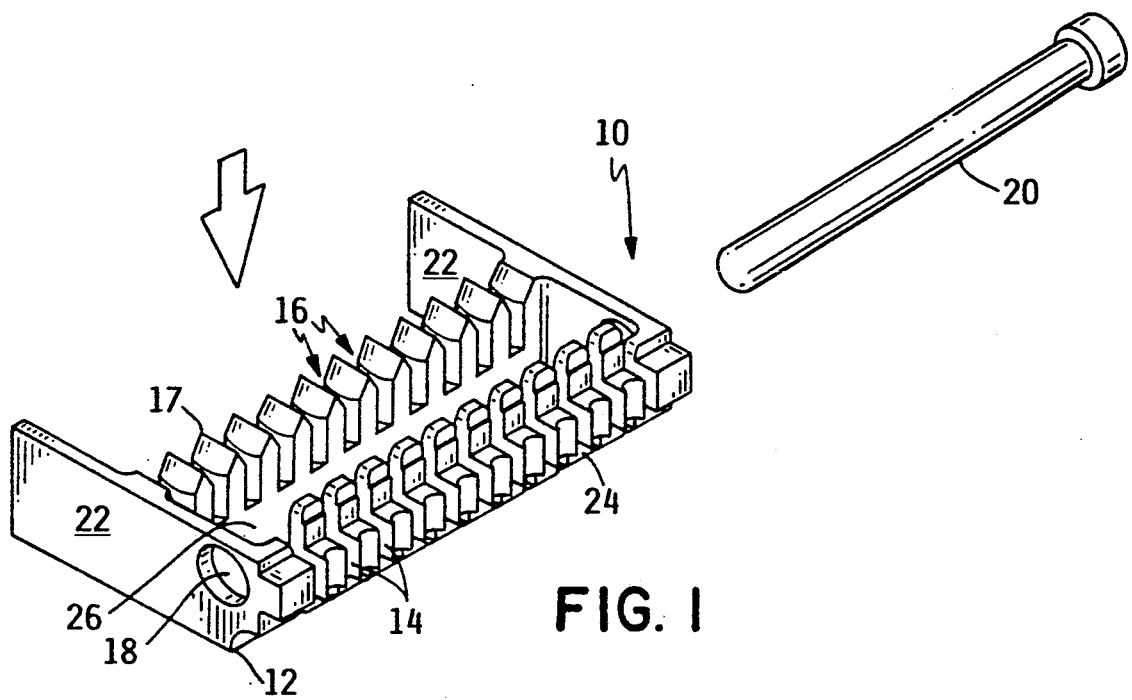
FIG. 1 is an isometric view of a head carrier according to the present invention.
Figure 2:
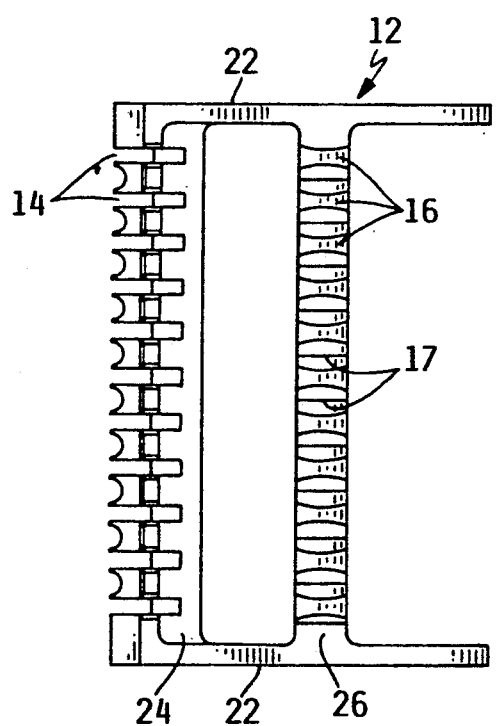
FIG. 2 is a plan view of the head carrier of FIG. 1.

FIGS. 1 and 2 show a head carrier 10 which includes a protective partial enclosure 12 moulded in one piece. The enclosure comprises two parallel side walls 22 attached at one end by a first cross member 24. A second cross member 26, parallel to the first, joins the side walls at a point further along their length.

A series of location slots 14, eleven in number, are located along the length of the first cross member 24. The same number of collapsing grooves 16 are situated along the length of the second cross member. In the second cross member, each of the ten tongues 17 formed by the grooves are bevelled at the top. A guide aperture 18, substantially circular in shape, is positioned near the end of each of the two side walls nearest the first cross member.

Figure 3:
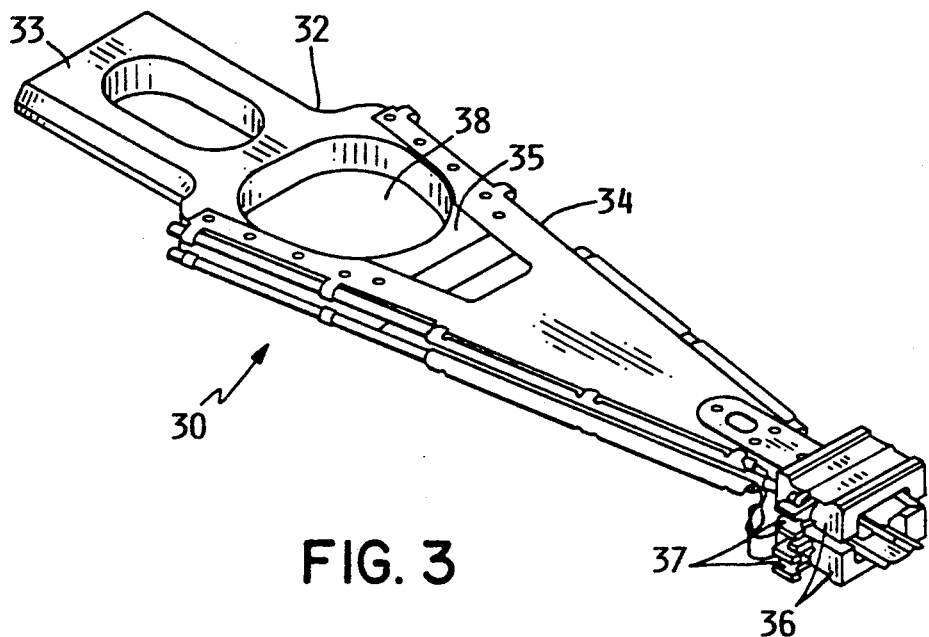
FIG. 3 is an isometric view of a head/arm assembly to be carried in the head carrier of FIG. 1 according to the present invention.

FIG. 3 shows a single head/arm assembly 30 in isometric view. Each of the head/arm assemblies comprises a one piece rigid arm 32, which consists of a flat tail portion 33, incorporating a substantially oval aperture. The two edges of the tail portion are bevelled. Extending from the tail is a truncated arrow head shaped portion 35 incorporating a larger aperture 38 which is substantially circular in shape. Attached, top and bottom, to the arrow shaped portion are a pair of flexures 34, to the free end of each of which is attached a slider 36 incorporating a magnetic transducer 37.

Figure 4:
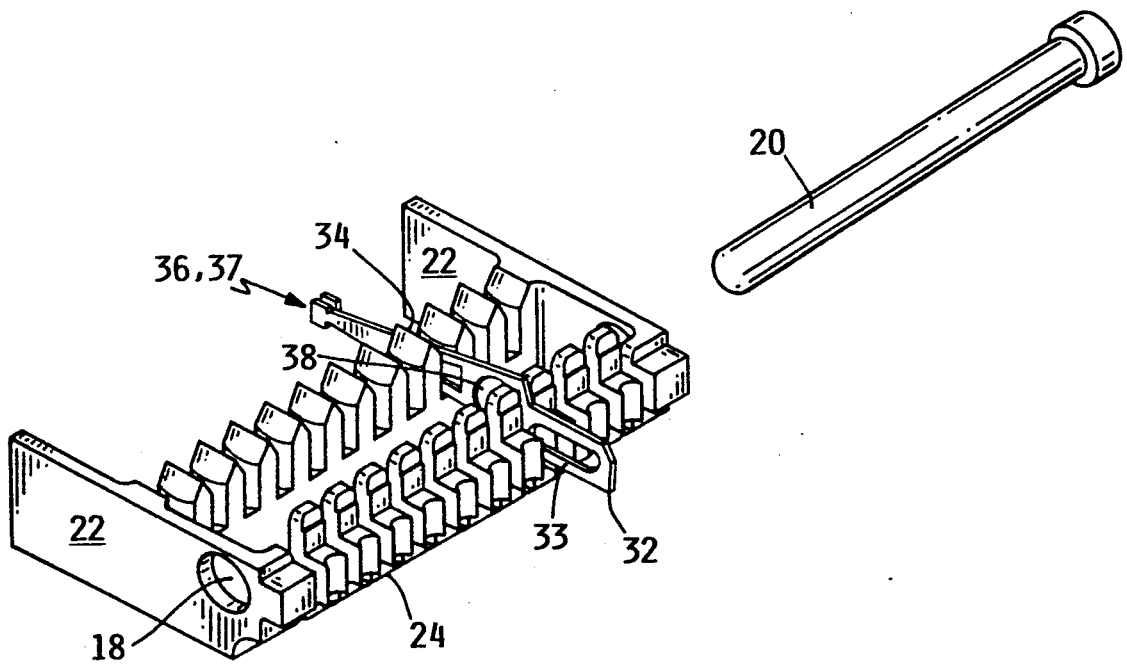
FIG. 4 is an isometric view of the head carrier of FIG. 1 with the head/arm assembly of FIG. 3 in place.

FIG. 4 shows the head carrier with one head/arm assembly in position. The tail 33 of the rigid arm locates in one slot 14 in the first cross member 24 so that a portion extends beyond the enclosure and the substantially circular hole 38 in the rigid arm is in line with the two guide apertures 18 in the enclosure side walls 22. The flexures are located in, and collapsed by, the corresponding slot 16 in the second cross member. The head/arm assembly is therefore held in the carrier by the slot 14 and corresponding groove 16 parallel to the side walls. The remaining head/arm assemblies are loaded into the carrier in the same way, forming a bank of assemblies in parallel spaced apart relationship.

The bulk of each of the magnetic head/arm assemblies is therefore located within the protective partial enclosure with only a portion of the rigid arm extending outside. The sensitive magnetic heads are afforded protection in one dimension by the extending arms of the two side walls 22.

When all the assemblies are in the correct position, the alignment pin 20 is pushed through the guide apertures 18 in the side walls and through the guide holes 38 in each of the rigid arm portions of each assembly. This locks the assemblies in place.

Figure 5:
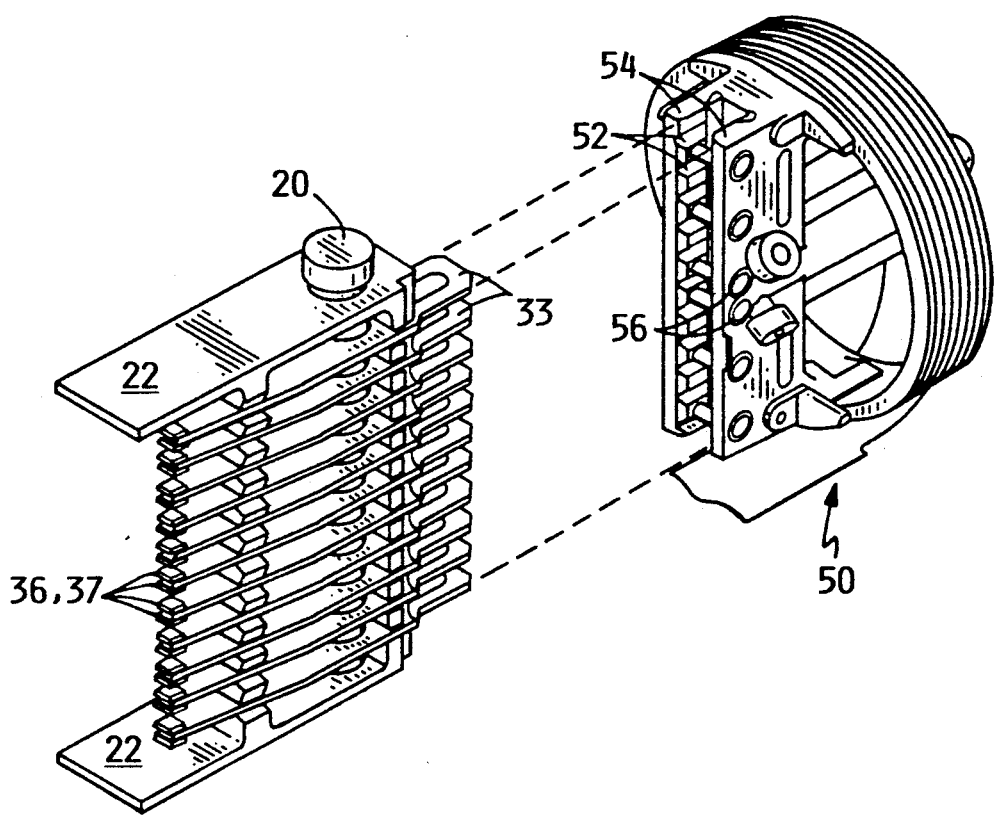
FIG. 5 is an isometric view of the head carrier of FIG. 1 loaded with head/arm assemblies and a portion of a disk file actuator mechanism adapted to receive the head/arm assemblies.

FIG. 5 shows the head/arm assemblies in position in the head carrier ready for assembly to the carriage of a linear actuator mechanism 50. The head carrier loaded with the head assemblies is presented to the actuator mechanism 50 so that the bevelled tail portion 33 of each rigid arm 32 locates in a corresponding slot, which comprises two "V" shaped grooves 52 in facing side members 54 in the actuator mechanism. When in place, the head/arm assemblies are secured in position by means of clamping bolts 56 which pass through both side members 54.

The carrier may then be left in place until the heads are merged to the disk stack. Either before or after merge to disk, the carrier is removed from the stack of head/arm assemblies by taking out the alignment pin and sliding off the carrier to one side.

We claim:

1. A head carrier (10) for carrying a plurality of head/arm assemblies (30) of the kind comprising a rigid arm portion (32) supporting two flexures (34) biased away from each other, each flexure in turn supporting at its free end a transducer bearing slider (36) for cooperation with a disk of a disk file, such assemblies being mountable by their rigid arm portions in a moving actuator for moving them over the surface of such disks, the carrier comprising a protective partial enclosure (12) for protecting the head/arm assemblies from damage when loaded in the carrier and, said enclosure comprising location means (14, 24) for locating and supporting said head/arm assemblies in parallel spaced apart relationship at a pitch corresponding to their eventual location in the actuator so that the flexures and heads lie within the protective partial enclosure and at least a portion of the rigid arm projects outside the carrier to enable it to be mounted in such an actuator without removal of the carrier.

2. A head carrier as claimed in claim 1, said enclosure further comprising guide apertures (18) corresponding to guide holes (38) in such head/arm assemblies, said carrier further comprising locking means (20) adapted to register with both the guide apertures in the enclosure and the guide holes in the head/arm assemblies so as to lock the head/arm assemblies in the partial enclosure in said parallel spaced apart relationship.

3. A head carrier as claimed in claim 2 wherein said locking means is a removable pin (20).

4. A head carrier as claimed in claim 1 wherein the partial enclosure comprises two parallel side walls (22) joined by a first cross member (24), the parallel side walls extending beyond the first cross member in their parallel direction so as to afford protection to the flexures and heads of such head/arm assmblies when loaded in the carrier.

5. A head carrier as claimed in claim 4 wherein the location means consist of a plurality of slots (14), one for each such head/arm assembly, situated along the length of the first cross member.

6. A head carrier as claimed in claim 4 wherein the parallel side walls are joined by a second cross member (26) provided with a plurality of grooves (16) located along the length of the second cross member, corresponding to the slots on the first cross member, each groove being adapted to collapse the two flexures of a corresponding head/arm assembly.

7. A head carrier as claimed in claim 1, said enclosure further comprising collapsing means (16, 17, 26) for acting on the two flexures of each head/arm assembly so as to bring them together.

8. A head carrier as claimed in claim 7, said enclosure further comprising guide apertures (18) corresponding to guide holes (38) in such head/arm assemblies, said carrier further comprising locking means (20) adapted to register with both the guide apertures in the enclosure and the guide holes in the head/arm assemblies so as to lock the head/arm assemblies in the partial enclosure in said parallel spaced apart relationship.

9. A head carrier as claimed in claim 8 wherein said locking means is a removable pin (20).

10. A head carrier as claimed in claim 9 wherein the partial enclosure comprises two parallel side walls (22) joined by a first cross member (24), the parallel side walls extending beyond the first cross member in their parallel direction so as to afford protection to the flexures and heads of such head/arm assemblies when loaded in the carrier.

11. A head carrier as claimed in claim 10 wherein the location means consists of a plurality of slots (14), one for each such head/arm assembly, situated along the length of the first cross member.

12. A head carrier as claimed in claim 11 wherein the parallel side walls are joined by a second cross member (26) provided with a plurality of grooves (16) located along the length of the second cross member, corresponding to the slots on the first cross member, each groove being adapted to collapse the two flexures of a corresponding head/arm assembly.

* * * * *